United States Patent
Doelle et al.

(10) Patent No.: US 10,069,165 B2
(45) Date of Patent: Sep. 4, 2018

(54) ELECTROLYTE COMPOSITION FOR A LITHIUM-ION BATTERY

(71) Applicant: Volkswagen Aktiengesellschaft, Wolfsburg (DE)

(72) Inventors: Janis Doelle, Yuseong-Gu (KR); Mirko Herrmann, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/960,879

(22) Filed: Dec. 7, 2015

(65) Prior Publication Data

US 2016/0087311 A1 Mar. 24, 2016

Related U.S. Application Data

(63) Continuation of application No. PCT/EP2014/061709, filed on Jun. 5, 2014.

(30) Foreign Application Priority Data

Jun. 7, 2013 (DE) .......... 10 2013 210 631

(51) Int. Cl.
*H01M 2/00* (2006.01)
*H01M 10/0567* (2010.01)
(Continued)

(52) U.S. Cl.
CPC ......... *H01M 10/0567* (2013.01); *H01M 2/02* (2013.01); *H01M 2/0202* (2013.01);
(Continued)

(58) Field of Classification Search
CPC ...... H01M 4/364; H01M 4/386; H01M 4/587; H01M 4/134; H01M 10/0525;
(Continued)

(56) References Cited

U.S. PATENT DOCUMENTS

| 5,112,704 A | 5/1992 | Furukawa et al. |
| 2011/0183218 A1 | 7/2011 | Odani et al. |

(Continued)

FOREIGN PATENT DOCUMENTS

| CN | 102394311 A | 3/2012 |
| DE | 38 55 872 T2 | 9/1997 |

(Continued)

OTHER PUBLICATIONS

Etacheri et al., "Exceptional Electrochemical Perofrmance of Si-Nanowires in 1,3-Dioxolane Solutions: A Surface Chemical Investigation," Langmuir, vol. 28, No. 14, pp. 6175-6184 (Apr. 10, 2012).

(Continued)

*Primary Examiner* — Gary D Harris
(74) *Attorney, Agent, or Firm* — Muncy, Geissler, Olds & Lowe, P.C.

(57) ABSTRACT

An electrolyte composition for a lithium-ion battery, a lithium-ion battery, and also the use of a fluorine-containing cyclic carbonate component and lithium nitrate for improving the cycle stability and/or for increasing the performance of a lithium-ion battery.

11 Claims, 4 Drawing Sheets

(51) Int. Cl.

| | |
|---|---|
| *H01M 4/134* | (2010.01) |
| *H01M 10/0525* | (2010.01) |
| *H01M 10/0568* | (2010.01) |
| *H01M 4/36* | (2006.01) |
| *H01M 4/38* | (2006.01) |
| *H01M 4/587* | (2010.01) |
| *H01M 2/02* | (2006.01) |

(52) U.S. Cl.
CPC ......... *H01M 2/0237* (2013.01); *H01M 4/134* (2013.01); *H01M 4/364* (2013.01); *H01M 4/386* (2013.01); *H01M 4/587* (2013.01); *H01M 10/0525* (2013.01); *H01M 10/0568* (2013.01); *H01M 2300/0025* (2013.01); *H01M 2300/0034* (2013.01); *H01M 2300/0037* (2013.01)

(58) Field of Classification Search
CPC .. H01M 10/0568; H01M 2/02; H01M 2/0237; H01M 2/0202; H01M 10/0567; H01M 2300/0037; H01M 2300/0025; H01M 2300/0034; Y02E 60/122
USPC .......................................... 429/163, 188, 199
See application file for complete search history.

(56) References Cited

U.S. PATENT DOCUMENTS

| | | | |
|---|---|---|---|
| 2012/0129054 A1 | 5/2012 | Huang et al. | |
| 2012/0258357 A1 | 10/2012 | Kim | |
| 2013/0244120 A1* | 9/2013 | Yu ..................... | H01M 10/0567 |
| | | | 429/332 |

FOREIGN PATENT DOCUMENTS

| | | |
|---|---|---|
| DE | 10 2011 054 122 A1 | 4/2013 |
| JP | H 03-8270 A | 1/1991 |
| JP | 2005-251456 A | 9/2005 |
| JP | 2005251456 A * | 9/2005 |
| JP | 2007-042329 A | 2/2007 |
| JP | 2007-173180 A | 7/2007 |
| JP | 2008-034334 A | 2/2008 |
| JP | 2010-129449 A | 6/2010 |
| JP | 2010129449 A * | 6/2010 |
| JP | 2011-150958 A | 8/2011 |
| KR | 10-2012-0115839 A | 10/2012 |
| WO | WO 2012/081710 A1 | 6/2012 |

OTHER PUBLICATIONS

Fridman et al., "A new advanced lithium ion battery: Combination of high performance amorphous columnar silicon thin film anode 5 V $LiNi_{0.5}Mn_{1.5}O_4$ spinel cathode and fluoroethylene carbonate-based electrolyte solution," Electrochemical Comm., vol. 33, pp. 31-34 (Apr. 18, 2013).

Profatilova et al., "Enhanced thermal stability of a lithiated nano-silicon electrode by fluoroethylene carbonate and vinylene carbonate," J. of Power Sources, vol. 222, pp. 140-149 (2013).

Korean Office Action for Korean Applicaton No. 10-2015-7034891 dated Jan. 25, 2017 with English translation.

Japanese Office Action for Japanese Patent Application No. 2016-517599 dated Nov. 24, 2016—English translation.

Chinese Office Action for Chinese Application No. 201480031894.9 dated Dec. 5, 2016—English translation.

Japanese Office Action for Japanese Application No. 2016-517599 dated Apr. 26, 2017—English translation.

* cited by examiner

ELECTROLYTE COMPOSITION FOR A LITHIUM-ION BATTERY

This nonprovisional application is a continuation of International Application No. PCT/EP2014/061709, which was filed on Jun. 5, 2014, and which claims priority to German Patent Application No. 10 2013 210 631.9, which was filed in Germany on Jun. 7, 2013, and which are both herein incorporated by reference.

BACKGROUND OF THE INVENTION

Field of the Invention

The present invention relates to an electrolyte composition for a lithium-ion battery with at least one cathode and at least one anode, a lithium-ion battery containing the electrolyte composition, and also the use of a fluorine-containing carbonate component and lithium nitrate for, for example, improving the cycle stability and/or for increasing the performance of a lithium-ion battery.

Description of the Background Art

Anodes known in the prior art for lithium-ion batteries (LIB) are generally made of graphitic carbon, which provides a theoretical capacity of 372 mAh/g. A lithium metal oxide compound, such as lithium cobalt dioxide $LiCoO_2$, lithium nickel dioxide $LiNiO_2$, lithium manganese dioxide $LiMnO_2$, lithium manganese oxide $LiMn_2O_4$, lithium nickel manganese oxide $Li_{1.0}Ni_{0.5}Mn_{1.5}O_4$, lithium nickel manganese cobalt oxide $LiNi_{0.33}Mn_{0.33}Co_{0.33}O_2$, or high energy lithium nickel manganese cobalt oxide $Li_{1.2}Ni_{0.176}Mn_{0.524}Co_{0.100}O_2$, is normally used as the active material for the cathode. The two electrodes, which is to say the anode and the cathode, are connected to one another by a nonaqueous liquid electrolyte, a polymer electrolyte, or a gel electrolyte.

The nonaqueous liquid electrolytes generally have one or more organic solvents and a lithium salt dissolved therein. Examples of the lithium salts involved are lithium hexafluorophosphate ($LiPF_6$), lithium tetrafluoroborate ($LiBF_4$), lithium perchlorate ($LiClO_4$), lithium hexafluoroarsenate ($LiAsF_6$), and lithium bis(oxalato)borate (LiBOB). The organic solvents typically are a combination of the following solvents: propylene carbonate (PC), ethylene carbonate (EC), dimethyl carbonate (DMC), diethyl carbonate (DEC), ethyl methyl carbonate (EMC), tetrahydrofuran (THF), 1,2-dimethoxyethane (DME), and 2-methyltetrahydrofuran (2Me-THF).

US 2012/0129054 A1 discloses a silicon anode battery having an electrolyte composition that includes fluoroethylene carbonate, also called FEC, as one additive among others.

Aurbach et al. (Langmuir, 2012, 28, 6175 to 6184) succeeded in demonstrating that the addition of lithium nitrate $LiNO_3$ to an electrolyte that has lithium bis(trifluoromethanesulfonyl)imide as conducting salt and dioxolane as solvent results in increased performance of lithium-ion batteries with silicon nanowires being used as the anode material.

Both the electrode materials and the electrolyte compositions can be changed or adjusted in order to increase the energy density for lithium-ion batteries. One possibility for improving the specific anode capacity is the use of elements that can enter into compounds with lithium, such as silicon, tin, antimony, aluminum, magnesium, and alloys thereof. By means of these chemical elements and compounds, more lithium can be reversibly stored than with graphitic carbon. Silicon anodes have a theoretical capacity of 3578 mAh/g at room temperature, for example. However, when these novel anode materials are used, a substantial volume change in the anode of as much as 300 to 400 volume percent occurs during the lithiation and delithiation due to the specific lithium storage mechanism (conversion reaction). The surface layer, also referred to as SEI (Solid Electrolyte Interface), that forms on the anode surface during the initial cycles is mechanically and/or chemically damaged because of the volume change in the anode during repeated lithiation and delithiation, however, and must be formed again for this reason. This results in a continual loss in capacity of the lithium-ion battery, among other effects.

SUMMARY OF THE INVENTION

It is therefore an object of the present invention to overcome the aforementioned disadvantages, and to provide a suitable electrolyte composition that facilitates the formation of an improved, in particular durable, surface layer, also referred to as SEI (Solid Electrolyte Interface) that forms on an anode surface during the initial cycles. Accordingly, an exemplary provides that the electrolyte composition, for example, prevents the surface layer from being mechanically and/or chemically damaged and having to be re-formed again after a plurality of cycles have occurred, which is to say after a plurality of charge and discharge processes. In particular, to provide an improved service life and/or cycle stability of a lithium-ion battery.

According to an exemplary embodiment of the invention, an electrolyte composition for a lithium-ion battery with at least one cathode and at least one anode, for example, a high-energy anode, is provided, wherein the electrolyte composition contains (i) at least one aprotic nonaqueous solvent, (ii) one fluorine-containing cyclic carbonate component and (iii) at least two lithium salts, wherein one lithium salt is lithium nitrate.

The term "fluorine-containing cyclic carbonate component" can be understood to mean a cyclic ester of carbonic acid that can be represented by the chemical formula R1-O—(C=O)—O—R2, where the groups R1 and R2 can be covalently bonded to one another and form a hydrocarbon chain, for example, with two to four carbon atoms, preferably with two carbon atoms, wherein the hydrocarbon chain has at least one or exactly one fluorine atom as substituent.

The term "lithium-ion battery" can be understood to mean a primary as well as a secondary lithium-ion battery, for example, a secondary lithium-ion battery. A primary lithium-ion battery can be a non-rechargeable lithium-ion battery, and a secondary battery can be a rechargeable lithium-ion battery. The lithium-ion battery according to an exemplary embodiment of the invention can have a casing, a battery core having at least one cathode and at least one anode, and/or an electrolyte composition according to an exemplary embodiment of the invention.

Despite a large volume change in the anode, for example, the high-energy anode, in particular the silicon anode and/or the silicon/carbon composite anode, during the lithiation and delithiation process, a very stable surface layer is formed on the anode surface, also called SEI, due to the combination according to an exemplary embodiment of the invention including: (i) an aprotic, for example, a carbonate, nonaqueous solvent, (ii) the fluorine-containing cyclic carbonate component, for example, fluoroethylene carbonate, and (iii) the two lithium salts, wherein one lithium salt is lithium nitrate. The surface layer on the anode can be formed by mechanisms including the partial decomposition of the chemical substances present in the electrolyte composition, for example, by the decomposition of the (i) at least one aprotic, for example, carbonate, nonaqueous solvent and (ii) the fluorine-containing cyclic carbonate component, for example the fluoroethylene carbonate. The lithium salt, lithium nitrate, can be likewise incorporated in the surface layer. Surprisingly, the stability of the surface layer is increased by the combination of the fluorine-containing cyclic carbonate component and the lithium nitrate, in particular. This specific surface layer makes it possible to keep the capacity of a lithium-ion battery nearly constant, preferably constant, over at least 60 cycles, preferably at least 100 cycles. As a result, the capacity of the lithium-ion battery after 60 cycles, preferably after 100 cycles, is at least 80%, preferably at least 85%, preferably at least 90%, preferably at least 95%, of the capacity of the same lithium-ion battery after the third charge and discharge cycle after it has initially been placed in operation. The service life and cycle stability of the anode and also of the lithium-ion battery has, surprisingly, been increased significantly due to the electrolyte composition according to an exemplary embodiment of the invention.

The lithium nitrate used as an additive is only soluble in very small quantities in the aprotic nonaqueous solvent used according to an exemplary embodiment of the invention, and in the quantities according to an exemplary embodiment of the invention, for example, forms a sediment in the electrolyte composition. Despite the very low solubility in the solvent used, a substantial improvement is achieved in the performance capacity and cycle stability of a lithium-ion battery through the use of lithium nitrate in the electrolyte composition in combination with the fluorine-containing cyclic carbonate component, for example, with the fluoroethylene carbonate.

An exemplary embodiment of the invention provides an electrolyte composition wherein the cyclic fluorine-containing carbonate component is present in a quantity from 1 to 50 percent by weight (relative to the total weight of the electrolyte composition). An especially stable surface layer on the anode surface is provided in this way.

The cyclic fluorine-containing carbonate component can be present in the electrolyte composition in a quantity from 0.05 to 50 percent by weight, preferably 5 to 50 percent by weight, preferably 5 to 20 percent by weight, preferably 8 to 12 percent by weight (in each case relative to the total weight of the electrolyte composition).

In an exemplary electrolyte composition of the invention, the lithium nitrate can be present in a quantity from 0.05 to 20 percent by weight (relative to the total weight of the electrolyte composition). Improved lithium transport through the surface layer to the anode surface is achieved by means of these lithium nitrate quantities.

The lithium nitrate can be present in the electrolyte composition in a quantity from 0.05 to 20 percent by weight, preferably 0.1 to 15 percent by weight, preferably 0.05 to 5 percent by weight, preferably 0.1 to 10 percent by weight, preferably 0.1 to 5 percent by weight, preferably 0.1 to 1 percent by weight, preferably 0.05 to 0.5 percent by weight (in each case relative to the total weight of the electrolyte composition).

The invention provides an electrolyte composition wherein the fluorine-containing cyclic carbonate component is fluoroethylene carbonate. Fluoroethylene carbonate is also referred to as 4-fluoro-1,3-dioxolan-2-one. Fluoroethylene carbonate has improved electrochemical stability as compared to the other fluorine-containing cyclic carbonate components.

An exemplary embodiment of the invention provides an electrolyte composition that can additionally contain vinylene carbonate. The vinylene carbonate has a film-forming effect, causing the surface layer to be formed faster and/or more stably on the anode surface.

The vinylene carbonate can be present in the electrolyte composition in a quantity from 0 to 10 percent by weight, preferably 0.05 to 10 percent by weight, preferably 1 to 5 percent by weight (in each case relative to the total weight of the electrolyte composition).

The at least one aprotic nonaqueous solvent can be chosen, for example, from propylene carbonate (PC), ethylene carbonate (EC), dimethyl carbonate (DMC), diethyl carbonate (DEC), ethyl methyl carbonate (EMC), tetrahydrofuran (THF), 1,2-dimethoxyethane (DME), 2-methyltetrahydrofuran (2Me-THF), vinylene carbonate (VC), N-methylpyrrolidone (NMP), acetonitrile, and/or ethyl acetate, or an arbitrary combination thereof.

The at least one aprotic nonaqueous solvent can be a carbonate nonaqueous solvent. The at least one carbonate nonaqueous solvent can be chosen, for example, from propylene carbonate (PC), ethylene carbonate (EC), dimethyl carbonate (DMC), diethyl carbonate (DEC), ethyl methyl carbonate (EMC), and/or vinylene carbonate (VC). A mixture of at least two carbonate nonaqueous solvents can be used, wherein the carbonate nonaqueous solvents can be chosen, for example, from propylene carbonate (PC), ethylene carbonate (EC), dimethyl carbonate (DMC), diethyl carbonate (DEC), ethyl methyl carbonate (EMC), and vinylene carbonate (VC). The can include ethylene carbonate (EC), dimethyl carbonate (DMC), and/or diethyl carbonate (DEC). Alternatively, the mixture can include two carbonate nonaqueous solvents chosen, for example, from propylene carbonate (PC), ethylene carbonate (EC), dimethyl carbonate (DMC), diethyl carbonate (DEC), ethyl methyl carbonate (EMC), and/or vinylene carbonate (VC) in a ratio, for example, of 3:7 to 7:3 (with respect to weight).

The maximum water content in the at least one aprotic nonaqueous solvent, for example, in the at least one carbonate nonaqueous solvent or in the electrolyte composition, can be at most 1000 ppm, preferably less than 500 ppm, preferably less than 50 ppm. The water content in the at least one aprotic nonaqueous solvent, for example, in the at least one carbonate nonaqueous solvent or in the electrolyte composition, can be at most 0.1 percent by weight, preferably less than 0.05 percent by weight, preferably less than 0.005 percent by weight (relative to the total weight of the solvent or of the electrolyte composition).

In an exemplary embodiment of the present invention, the electrolyte composition can have the at least one aprotic or carbonate nonaqueous solvent in a quantity of more than 50 percent by weight, preferably more than 60 percent by weight, preferably more than 70 percent by weight, preferably more than 80 percent by weight, preferably more than 90 percent by weight, preferably more than 95 percent by weight, preferably more than 99 percent by weight, preferably more than 99.9 percent by weight, preferably 100% (with respect to the solvent present in the electrolyte composition).

In addition to the lithium salt lithium nitrate, the electrolyte composition can have at least one additional lithium salt, chosen, for example from lithium bis(fluorosulfonyl) imide, lithium hexafluorophosphate, lithium tetrafluoroborate, lithium perchlorate, lithium hexafluoroarsenate, lithium bis(oxalato)borate, and/or lithium difluorooxalatoborate, or an arbitrary combination thereof. The at least one additional lithium salt can serve as a conducting salt. The concentration of the additional lithium salt or the conducting salt, can be in the range from 0.8 to 1.2 M (mol/L).

The electrolyte composition can have lithium bis(fluorosulfonyl)imide as the additional lithium salt in addition to the lithium salt lithium nitrate. Especially long service life and high cycle stability of a lithium-ion battery is achieved via the specific combination of lithium nitrate, lithium bis(fluorosulfonyl)imide, and/or the fluorine-containing cyclic carbonate component, for example, fluoroethylene carbonate. Moreover, lithium bis(fluorosulfonyl)imide can have the advantage that it has a higher thermal stability, i.e. of approximately 95° C., in comparison to other lithium salts, such as $LiPF_6$, which have a thermal stability of approximately 65° C. As a result, the cycling capacity of the anode at higher temperatures is considerably improved. By means of the specific use of the lithium salt lithium bis(fluorosulfonyl)imide, a significant performance improvement is achieved with common solvents and lithium nitrate and the fluorine-containing cyclic carbonate component, for example, fluoroethylene carbonate.

The electrolyte composition can have 1 M (mol/L) $LiPF_6$ in a mixture of ethylene carbonate and dimethyl carbonate, 20 percent by weight fluoroethylene carbonate, and 0.1 percent by weight $LiNO_3$, wherein the ethylene carbonate and the dimethyl carbonate can be present in a weight ratio of 1:1.

Alternatively, the electrolyte composition can have 1 M $LiPF_6$ in a mixture of ethylene carbonate and diethyl carbonate, 5 percent by weight fluoroethylene carbonate, and 1 percent by weight $LiNO_3$, wherein the ethylene carbonate and the diethyl carbonate can be present in a weight ratio of 1:1.

Alternatively, the electrolyte composition can have 1 M $LiPF_6$ in a mixture of ethylene carbonate and ethyl methyl carbonate, 10 percent by weight fluoroethylene carbonate, 0.15 percent by weight $LiNO_3$ and 1 percent by weight vinylene carbonate, wherein the ethylene carbonate and the ethyl methyl carbonate can be present in a weight ratio of 1:1.

Alternatively, the electrolyte composition can have 0.8 M $LiPF_6$ in a mixture of ethylene carbonate, diethyl carbonate, and dimethyl carbonate, 10 percent by weight fluoroethylene carbonate, and 0.5 percent by weight $LiNO_3$, wherein the ethylene carbonate, the diethyl carbonate, and the dimethyl carbonate can be present in a weight ratio of 1:1:1.

Alternatively, the electrolyte composition can have 1 M $LiPF_6$ in a mixture of ethylene carbonate, diethyl carbonate and dimethyl carbonate, 10 percent by weight fluoroethylene carbonate and 0.5 percent by weight $LiNO_3$, wherein the ethylene carbonate, the diethyl carbonate, and the dimethyl carbonate can be present in a weight ratio of 1:1:1.

Alternatively, the electrolyte composition can have 1.2 M $LiPF_6$ in a mixture of ethylene carbonate, diethyl carbonate and dimethyl carbonate, 10 percent by weight fluoroethylene carbonate and 0.5 percent by weight $LiNO_3$, wherein the ethylene carbonate, the diethyl carbonate, and the dimethyl carbonate can be present in a weight ratio of 1:1:1.

Alternatively, the electrolyte composition can have 1 M $LiPF_6$ in a mixture of ethylene carbonate, diethyl carbonate and dimethyl carbonate, 10 percent by weight fluoroethylene carbonate and 0.3 percent by weight $LiNO_3$, wherein the ethylene carbonate, the diethyl carbonate, and the dimethyl carbonate can be present in a weight ratio of 1:1:1.

Alternatively, the electrolyte composition can have 1 M $LiPF_6$ in a mixture of ethylene carbonate, diethyl carbonate and dimethyl carbonate, 10 percent by weight fluoroethylene carbonate and 0.1 percent by weight $LiNO_3$, wherein the ethylene carbonate, the diethyl carbonate, and the dimethyl carbonate can be present in a weight ratio of 1:1:1.

Alternatively, the electrolyte composition can have 1 M lithium bis(fluorosulfonyl)imide in a mixture of ethylene carbonate, diethyl carbonate and dimethyl carbonate, 10 percent by weight fluoroethylene carbonate and 0.5 percent by weight $LiNO_3$, wherein the ethylene carbonate, the diethyl carbonate, and the dimethyl carbonate can be present in a weight ratio of 1:1:1.

Alternatively, the electrolyte composition can have 0.8 M lithium bis(fluorosulfonyl)imide in a mixture of ethylene carbonate, diethyl carbonate and dimethyl carbonate, 5 percent by weight fluoroethylene carbonate and 1 percent by weight $LiNO_3$, wherein the ethylene carbonate, the diethyl carbonate, and the dimethyl carbonate can be present in a weight ratio of 1:1:1.

Alternatively, the electrolyte composition can have 1.2 M lithium bis(fluorosulfonyl)imide in a mixture of ethylene carbonate and diethyl carbonate, 20 percent by weight fluoroethylene carbonate, 0.15 percent by weight $LiNO_3$ and 1 percent by weight vinylene carbonate, wherein the ethylene carbonate and the diethyl carbonate can be present in a weight ratio of 1:1.

Alternatively, the electrolyte composition can have 1 M lithium bis(fluorosulfonyl)imide in a mixture of ethylene carbonate, diethyl carbonate, and dimethyl carbonate, 15 percent by weight fluoroethylene carbonate and 0.5 percent by weight $LiNO_3$, wherein the ethylene carbonate, the diethyl carbonate, and the dimethyl carbonate can be present in a weight ratio of 1:1:1.

According to an exemplary embodiment of the invention, a lithium-ion battery can be provided that comprises (a) a casing, (b) a battery core that has at least one cathode and at least one anode, for example, at least one high-energy anode, and/or (c) an electrolyte composition according to an exemplary embodiment of the invention.

In an exemplary embodiment of the present invention, the battery core additionally can have at least one separator element or at least two separator elements or exactly two separator elements, preferably for each anode/cathode pair. The at least one separator element can be impregnated with an electrolyte composition, for example, in a quantity of 5 μL to 500 μL per $cm^2$ of the at least one separator element, in a quantity of 100 μL to 500 μL per $cm^2$ of the at least one separator element, for example, in research test cells, or in a quantity of 5 μL to 50 μL per $cm^2$ of the at least one separator element, for example, in full cells, in particular in order to reduce the weight of the battery. The at least one separator element can be a microporous, for example, a ceramic and heat-resistant, membrane that may be permeable to ions.

The anode, for example, the high-energy anode, can be a silicon anode. Alternatively, a composite anode of graphite and a metal or a metal alloy, wherein the metal can be chosen, for example, from silicon, tin, antimony, magnesium, and/or aluminum, or an arbitrary mixture thereof, and can serve as the anode according to an exemplary embodiment of the invention, for example, as a high-energy anode. The anode or the high-energy anode can be a silicon/carbon composite anode.

The silicon anode and the silicon/carbon composite anode have a high theoretical capacity.

The silicon/carbon composite anode can have 5 to 50 percent by weight, 10 to 30 percent by weight, or 20 percent by weight silicon nanoparticles; 45 to 75 percent by weight, 50 to 70 percent by weight, or 60 percent by weight graphite;

5 to 15 percent by weight or 12 percent by weight carbon black; and 5 to 15 percent by weight or 8 percent by weight binder.

The binder can contain at least one component chosen, for example, from polyacrylic acid, sodium cellulose, sodium alginate, and/or SBR ("styrene-butadiene rubber") latex. The binder can be a polyacrylic acid-based binder.

The cathode contains, for example, a lithium metal oxide compound. The lithium metal oxide compound can be selected, for example, from lithium cobalt dioxide $LiCoO_2$, lithium nickel dioxide $LiNiO_2$, lithium manganese dioxide $LiMnO_2$, lithium manganese oxide $LiMn_2O_4$, lithium nickel manganese oxide $Li_{1.0}Ni_{0.5}Mn_{1.5}O_4$, lithium nickel manganese cobalt oxide $LiNi_{0.33}Mn_{0.33}Co_{0.33}O_2$, and/or high energy lithium nickel manganese cobalt oxide $Li_{1.2}Ni_{0.176}Mn_{0.524}Co_{0.100}O_2$. The lithium metal oxide compound can be lithium nickel manganese cobalt oxide $LiNi_{0.33}Mn_{0.33}Co_{0.33}O_2$.

According to an exemplary embodiment of the invention, a use is provided of a fluorine-containing cyclic carbonate component and lithium nitrate, in particular in an electrolyte composition to improve the cycle stability of a lithium-ion battery.

According to an exemplary embodiment of the invention, a use is provided of a fluorine-containing cyclic carbonate component and lithium nitrate, in particular in an electrolyte composition to increase the performance of a lithium-ion battery.

The combination according to an exemplary embodiment of the invention includes (i) the fluorine-containing cyclic carbonate component, for example, fluoroethylene carbonate, and (ii) the lithium salt lithium nitrate that can be used, for example, in conjunction with the other components of the electrolyte composition according to an exemplary embodiment of the invention, for the purpose of keeping the capacity of a lithium-ion battery nearly constant or constant over at least 60 cycles, preferably at least 100 cycles. The capacity of the lithium-ion battery after 60 cycles, preferably after 100 cycles, as a result of the use of the (i) fluorine-containing cyclic carbonate component, in particular fluoroethylene carbonate, and (ii) the lithium nitrate, in particular in conjunction with the other components of the electrolyte composition, is, for example, at least 80%, at least 85%, at least 90%, or at least 95% of the capacity of the same lithium-ion battery after the third charge and discharge cycle after it has initially been placed in operation.

The present invention also relates to the above-mentioned use, wherein the fluorine-containing carbonate component can be fluoroethylene carbonate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
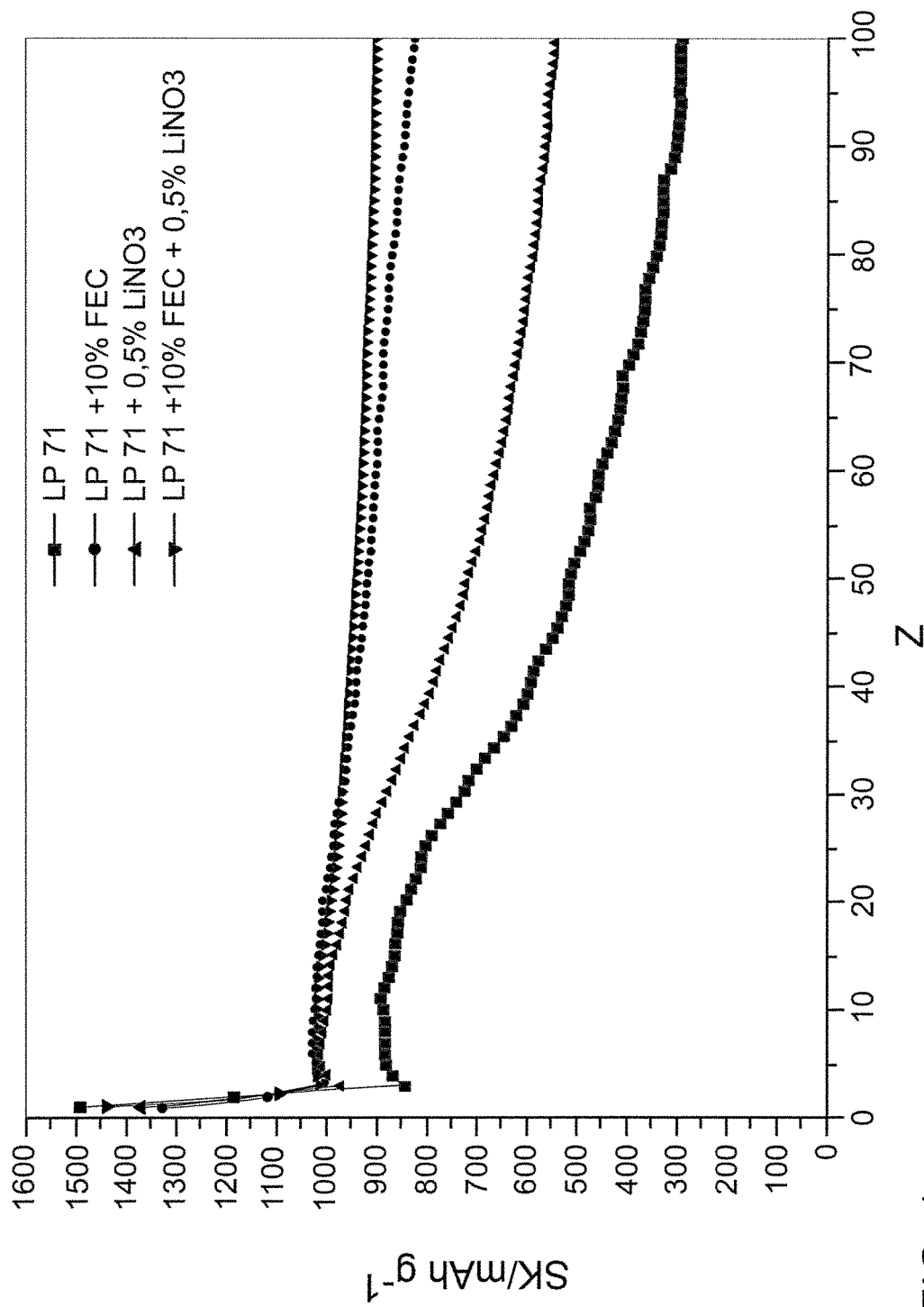
FIGS. 1 to 4 show capacities and cycle stabilities of various lithium-ion batteries according to exemplary embodiments of the invention.

FIG. 1 shows specific capacities SK and cycle stabilities of a) a standard electrolyte LP 71 (1M $LiPF_6$ in EC/DEC/DMC 1:1:1 wt.), b) LP 71+10% FEC, c) LP 71+0.5% $LiNO_3$, and d) LP 71+10% FEC+0.5% $LiNO_3$ in test cells with a silicon/carbon composite working electrode and lithium counter electrode (2 cycles with a C-rate of C/10; 98 cycles with a C-rate of 1C).

Figure 2:
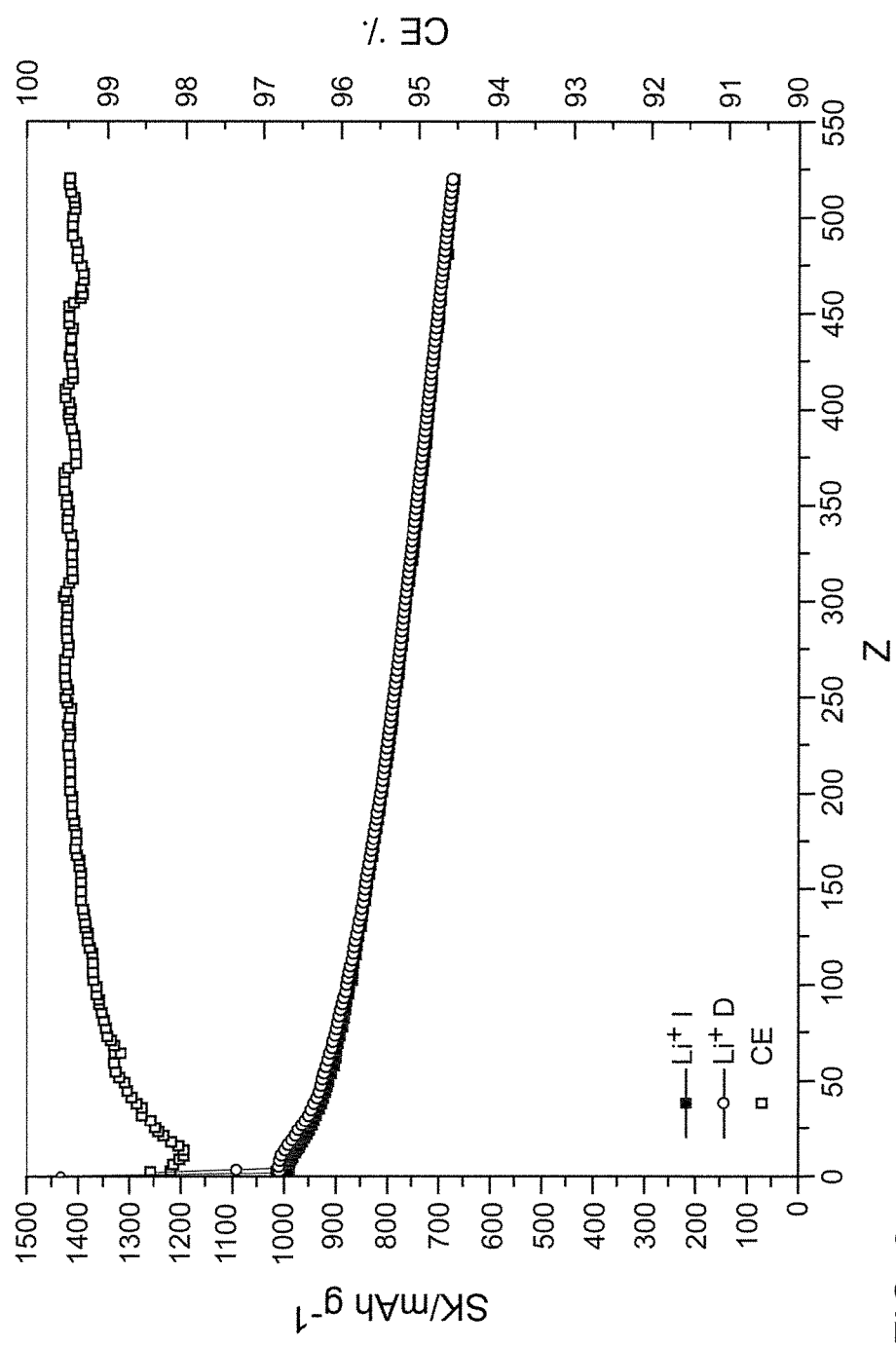

FIG. 2 shows the specific capacity SK of a test cell with a silicon/carbon composite working electrode and lithium counter electrode with LP 71+10% FEC+0.5% $LiNO_3$ in the electrolyte composition (2 cycles with a C-rate of C/10; 98 cycles with a C-rate of 1C).

Figure 3:
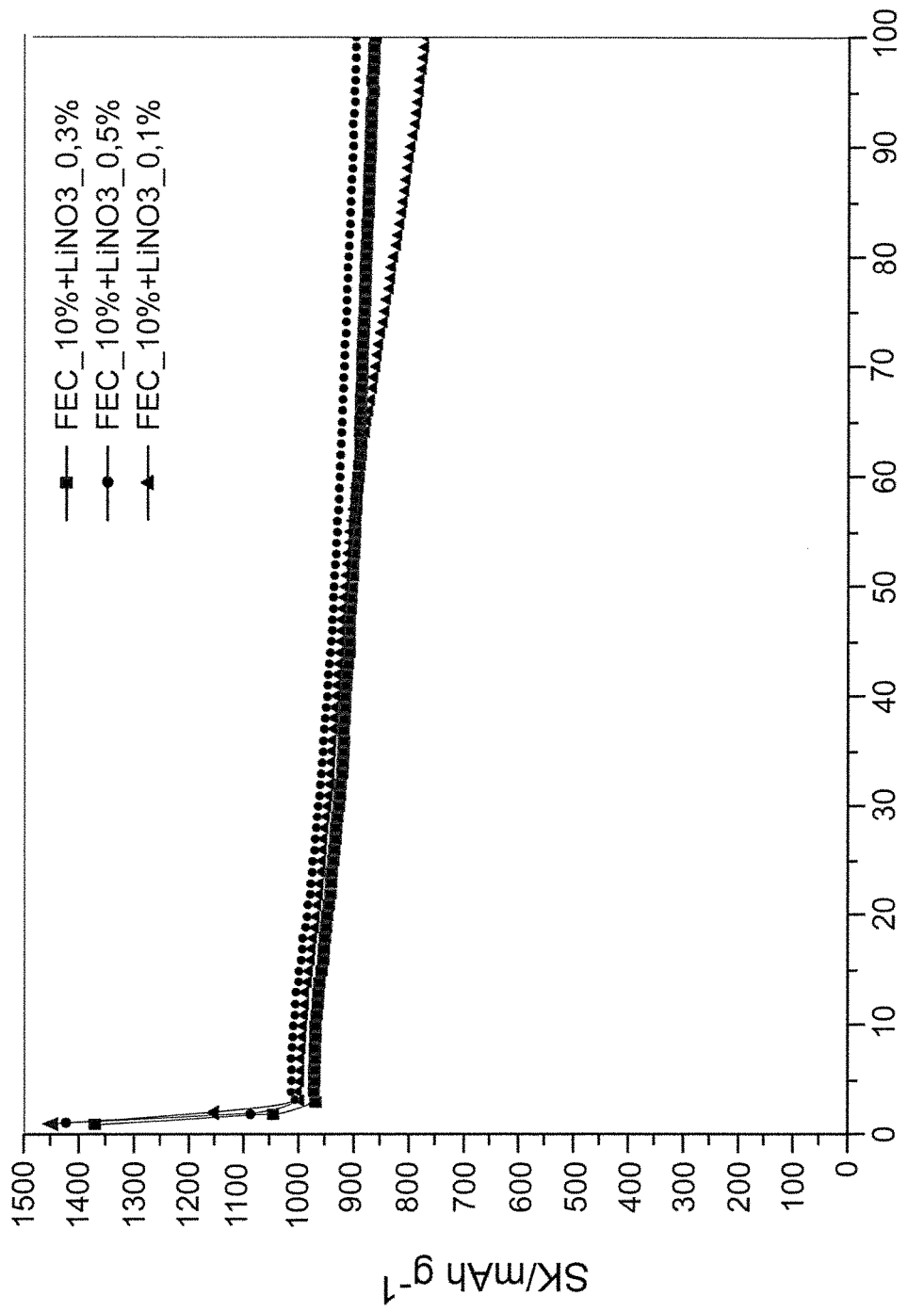

FIG. 3 shows the capacities and the cycle stabilities of lithium-ion batteries with different electrolyte compositions containing LP 71, 10% FEC and a) 0.1%, b) 0.3%, and c) 0.5% lithium nitrate (2 cycles with a C-rate of C/10; 98 cycles with a C-rate of 1C).

Figure 4:
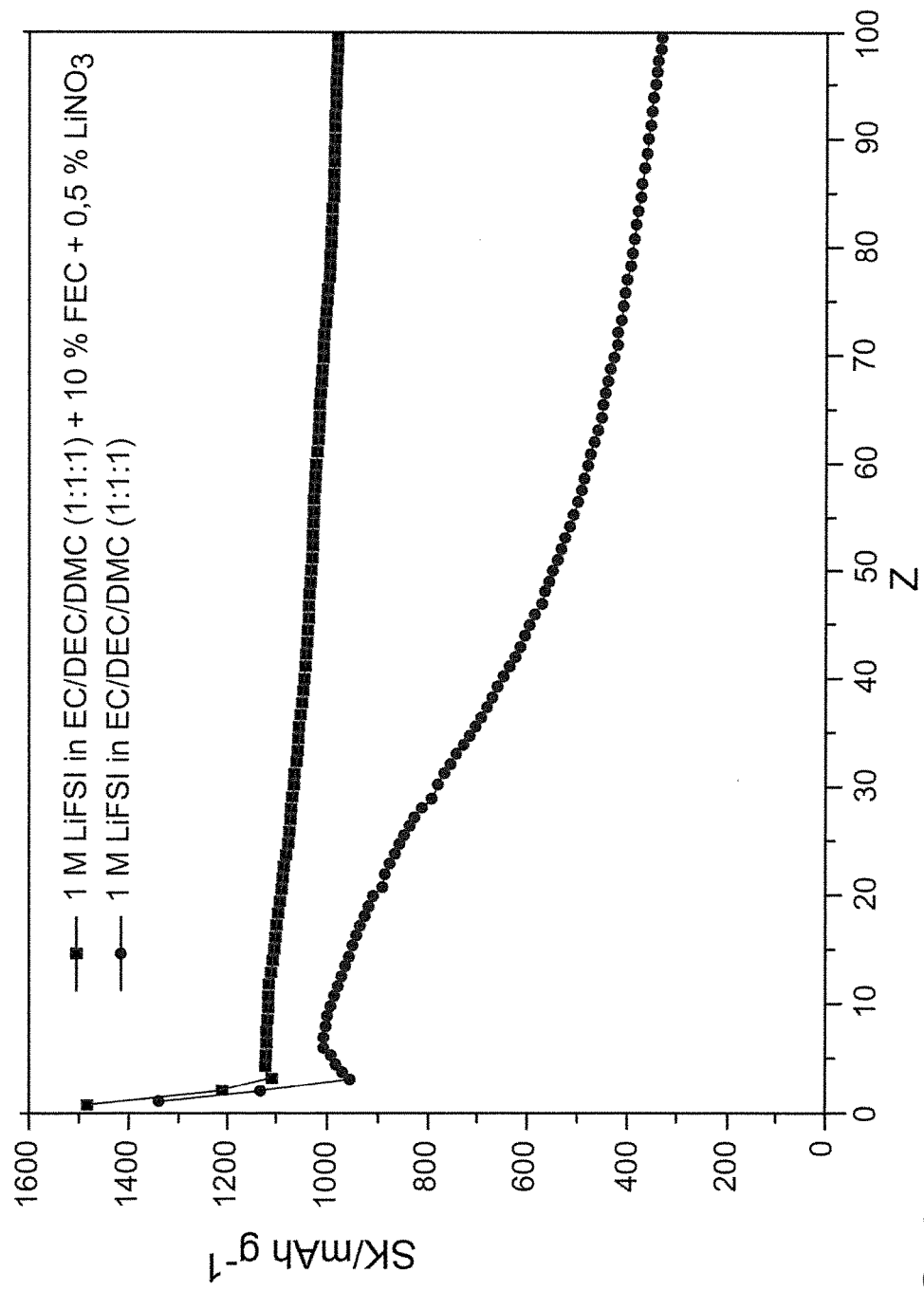

FIG. 4 shows the specific capacity SK (mAh/g) of a lithium-ion battery with a standard electrolyte composition, which is to say with lithium bis(fluorosulfonyl)imide, but without lithium nitrate and fluoroethylene carbonate (curve with circle symbols), and with an electrolyte composition according to an exemplary embodiment of the invention with lithium bis(fluorosulfonyl)imide, lithium nitrate, and fluoroethylene carbonate (curve with square symbols) over the cycles Z (2 cycles with a C-rate of C/10; 98 cycles with a C-rate of 1C). The specific capacity K of a lithium-ion battery with electrolyte composition according to an exemplary embodiment of the invention remains nearly constant from the third cycle after initial use onward over more than 100 cycles. The specific capacity K of a lithium-ion battery with standard electrolyte composition, in contrast, drops from approximately 1000 mAh/g to less than 400 mAh/g after 90 cycles.

The following abbreviations are used in the figures:
SK=Specific capacity
FEC=Fluoroethylene carbonate
Z=Cycles
CE=Coulomb efficiency
$Li^+$ I=Lithium insertion
$Li^l$ D=Lithium desertion 1. Test Series with $LiPF_6$ as the Second lithium salt To start with, a certain quantity of FEC, which was in the range from 1 to 50 percent by weight, was added to common, commercially available nonaqueous electrolytes, namely LP 71 (1M $LiPF_6$ in EC/DEC/DMC in a weight ratio of 1:1:1), LP 30 (1M $LiPF_6$ in EC/DMC in a weight ratio of 1:1), LP 40 (1M $LiPF_6$ in EC/DEC in a weight ratio of 1:1), LP 50 (1M $LiPF_6$ in EC/EMC in a weight ratio of 1:1) (Merck company, now BASF), or 1 M $LiPF_6$ in EC/DMC in a weight ratio of 3:7. After that, $LiNO_3$ in a quantity of 0.05 to 20 percent by weight was added to this mixture as a second additive, and the electrolyte composition was mixed for several hours with a magnetic stirrer. Then the electrolyte composition was tested in research test cells (half cells versus lithium) with a silicon/carbon working electrode. Composition of the silicon/carbon working electrode is: silicon nanoparticles 20 percent by weight, graphite 60 percent by weight, carbon black 12 percent by weight, and polyacrylic acid binder 8 percent by weight. The cells were assembled in an argon-filled glove box; for this purpose, two Celgard separators were placed between the working electrode and lithium counter electrode and impregnated with different amounts of the electrolyte, namely 100 μL to 500 μL per separator. After assembly, electrochemical cycling tests were performed at different C-rates. For comparison, all tests were also performed with the standard electrolyte, e.g., LP71, as well as the electrolytes with only one additive apiece, e.g., LP 71+FEC and LP 71+LiNO3, in order to thus investigate and demonstrate the effect of the combination of these two additives (see FIG. 1).

In addition to the investigation of the effect of the novel electrolyte in research test cells, full cells were also constructed that have a silicon/carbon anode and a $LiNi_{0.33}Mn_{0.33}Co_{0.33}O_2$ (NMC) cathode. The standard "18650" cell design was chosen for this purpose in order to characterize the performance in full cells without a lithium counter electrode.

An advantageous selection of the examples specified above is listed below:
1. Electrolyte composition: LP 30 (1M $LiPF_6$ in EC/DMC 1:1 wt.)+20 percent by weight FEC+0.1 percent by weight LiNO3
2. Electrolyte composition: LP 40 (1M $LiPF_6$ in EC/DEC 1:1 wt.)+5 percent by weight FEC+1 percent by weight $LiNO_3$
3. Electrolyte composition: LP 50 (1M $LiPF_6$ in EC/EMC 1:1 wt.)+10 percent by weight FEC+0.15 percent by weight $LiNO_3$+1% VC
4. Electrolyte composition: LP 71 (1M $LiPF_6$ in EC/DEC/DMC 1:1:1 wt.)+10 percent by weight FEC+0.5 percent by weight $LiNO_3$
5. Electrolyte composition: LP 71 (1M $LiPF_6$ in EC/DEC/DMC 1:1:1 wt.)+10 percent by weight FEC+0.3 percent by weight $LiNO_3$
6. Electrolyte composition: LP 71 (1M $LiPF_6$ in EC/DEC/DMC 1:1:1 wt.)+10 percent by weight FEC+0.1 percent by weight $LiNO_3$ 2. Test Series with lithium bis(fluorosulfonyl)imide (LiFSI) as the Second lithium salt To start with, a certain concentration of LiFSI (0.8 to 1.2 M) was added to common, commercially available nonaqueous solvent combinations such as, e.g., EC/DEC 1:1, EC/DEC 3:7, EC/EMC 1:1, EC/DMC 1:1, EC/EMC 3:7, EC/DMC 3:7, EC/DEC/EMC 1:1:1, EC,DMC,EMC 1:1:1, EC/DEC/DMC 1:1:1, (Sigma Aldrich company), and this conducting salt was dissolved in the solvents. Then a certain quantity of FEC was added, which was in the above-mentioned range from 0.05 to 50 wt. %. After that, $LiNO_3$ in a quantity of 0.05 to 20 wt. % was added to this new mixture as a second additive, and the electrolyte composition was mixed for several hours with a magnetic stirrer. Then the electrolyte composition was tested in research test cells (half cells versus lithium) with a silicon/carbon working electrode (example compositions: silicon nanoparticles 20 wt. %, graphite 60 wt. %, carbon black 12 wt. % and polyacrylic acid binder 8 wt. %, or silicon nanoparticles 10 wt. %, graphite 77 wt. %, carbon black 5 wt. %, and polyacrylic acid binder 8 wt. %). The cells were assembled in an argon-filled glove box; for this purpose, two Celgard separators were placed between the working electrode and lithium counter electrode and impregnated with different amounts of the electrolyte composition (100 to 500 μL per separator). After assembly, electrochemical cycling tests were performed at different C-rates. For comparison, all tests were also performed with the reference electrolyte 1 M LiFSI in EC/DEC/DMC 1:1:1 without additives, in order to thus demonstrate and verify the effect of the novel electrolyte composition (see FIG. 4).

An exemplary selection of the examples specified above is listed below:
1.) Electrolyte composition: (1M LiFSI in EC/DMC/DEC 1:1:1 wt.)+10 wt. % FEC+0.5 wt. % $LiNO_3$
2.) Electrolyte composition: (0.8M LiFSI in EC/EMC 1:1:1 wt.)+5 wt. % FEC+1 wt. % $LiNO_3$
3.) Electrolyte composition: (1.2M LiFSI in EC/ /DEC 1:1:1 wt.)+20 wt. % FEC+0.15 wt. % $LiNO_3$+1% VC
4.) Electrolyte composition: (1M LiFSI in EC/DEC/DMC 1:1:1 wt.)+15 wt. % FEC+0.5 wt. % $LiNO_3$ The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electrolyte composition for a lithium-ion battery with at least one cathode and at least one anode, the electrolyte composition comprising:
    at least one aprotic nonaqueous solvent;
    one fluorine-containing cyclic carbonate component; and
    at least two lithium salts,
    wherein one of the lithium salts is lithium nitrate, which is present in a quantity from 0.05% to 20% by weight relative to a total weight of the electrolyte composition,
    wherein the fluorine-containing cyclic carbonate component is present in a quantity from 5% to 12% by weight relative to the total weight of the electrolyte composition,
    wherein the anode is a silicon anode or a silicon/carbon composite anode, and wherein the electrolyte composition contains lithium bis(fluorosulfonyl)imide as an additional lithium salt.

2. The electrolyte composition according to claim 1, wherein the fluorine-containing cyclic carbonate component is fluoroethylene carbonate.

3. A lithium-ion battery comprising:
    a casing;
    a battery core having at least one cathode and at least one anode, wherein the anode is a silicon anode or a silicon/carbon composite anode; and
    an electrolyte composition according to claim 1.

4. The electrolyte composition according to claim 1, wherein the fluorine-containing cyclic carbonate component and lithium nitrate improve a cycle stability of a lithium-ion battery.

5. The electrolyte composition according to claim 1, wherein the fluorine-containing cyclic carbonate component and lithium nitrate increase a performance of a lithium-ion battery.

6. The electrolyte composition according to claim 1, wherein the fluorine-containing cyclic carbonate component and lithium nitrate form a surface layer on the anode.

7. The electrolyte composition according to claim 6, further comprising vinylene carbonate.

8. The lithium-ion battery according to claim 3, wherein the battery core further comprises at least one separator element.

9. The lithium-ion battery according to claim 8, wherein the at least one separator element has a microporous structure.

10. The electrolyte composition according to claim 1, wherein the at least one aprotic nonaqueous solvent is propylene carbonate (PC), ethylene carbonate (EC), dimethyl carbonate (DMC), diethyl carbonate (DEC), ethyl methyl carbonate (EMC), tetrahydrofuran (THF), 1,2-dimethoxyethane (DME), 2-methyltetrahydrofuran (2Me-THF), vinylene carbonate (VC), N-methylpyrrolidone (NMP), acetonitrile, or ethyl acetate, or a combination thereof.

11. An electrolyte composition for a lithium-ion battery with at least one cathode and at least one anode, the electrolyte composition comprising:
at least one aprotic nonaqueous solvent;
one fluorine-containing cyclic carbonate component; and
at least two lithium salts,
wherein one of the lithium salts is lithium nitrate,
wherein the fluorine-containing cyclic carbonate component is present in a quantity from 5% to 12% by weight relative to the total weight of the electrolyte composition,
wherein the anode is a silicon anode or a silicon/carbon composite anode, and
wherein the electrolyte composition contains lithium bis (fluorosulfonyl)imide as an additional lithium salt.

* * * * *